INVENTOR.
THEODORE J. GORDON
BY
-AGENT-

INVENTOR.
THEODORE J. GORDON

BY

— AGENT —

United States Patent Office 3,527,880
Patented Sept. 8, 1970

3,527,880
PSEUDO STEREO-OPTICAL OBSERVATION MEANS
Theodore J. Gordon, Newport Beach, Calif., assignor, by mesne assignments, to McDonnell Douglas Corporation, Santa Monica, Calif., a corporation of Maryland
Filed Jan. 25, 1967, Ser. No. 611,750
Int. Cl. H04n 5/78, 9/54
U.S. Cl. 178—6                                     7 Claims

ABSTRACT OF THE DISCLOSURE

Pseudo stereo-optical observations of a tracked object or area are made with a single telescope mounted on a vehicle by splitting the optical image beam wherein one part is viewed by one eye and the other part is converted by a television camera for recording on magnetic tape with playback at a variable delay time to a television monitor which produces a delayed image viewed by the other eye. In another version, the optical image is converted and recorded on one or two channels of tape, and a recorded signal in each of these instances is variably delayed with respect to the signal being recorded or to the other channel signal, respectively, and each pair of relatively delayed signals are used to produce separate images on television monitoring means for viewing by respective eyes of a viewer.

BACKGROUND OF THE INVENTION

This invention pertains generally to the field of optics and more particularly to a means and method for making pseudo stereo-optical observations using a single telescope.

Stereoscopic observations are, of course, normally made using two telescopes arranged in a binocular wherein the radius of stereoscopic vision, which is the limit in distance that the minimum detectable difference in binocular parallax angles is perceptible, is increased with the combined effect of magnification and increased lateral separation of the objectives over that of eyepiece (interpupillary) separation. While the magnification of the telescopes of a binocular may be made reasonably large, there is, however, a practical limit to which their objectives may be laterally displaced in order to increase the parallax angle of a viewed object. The same is true with a stereocamera in which two views of an object or scene are simultaneously recorded. Obviously, where large telescopes are used and their required lateral spacing is made great in order to achieve the desired stereoscopic effect, the resulting optical system will be extremely large, bulky and heavy.

SUMMARY OF THE INVENTION

Briefly, and in general terms, the present invention accomplishes pseudo streo-optical observations of a tracked object or area by employing a single telescope which is suitably mounted on a vehicle to produce an optical image that is utilized to provide two separate images of the tracked object or area wherein one image is time-delayed a variable amount with respect to the other image and these relatively delayed images are presented for viewing to the respective eyes of an observer.

The delayed image is obtained in one embodiment of the invention by splitting the telescope optical image beam wherein one part is viewed by one eye and the other part is viewed by a television camera and converted into an electrical signal which is preferably recorded on magnetic tape with playback at an adjustable delay time to a video monitor that displays a variably delayed image for viewing to the other eye.

In another embodiment of the invention, the optical image from the telescope is converted and recorded on tape, and a readout head which is longitudinally positionable along the tape path is adjustably located on the tape to provide a video output signal that is variably delayed with respect to the signal being recorded. The signal being recorded and the relatively delayed signal are adapted to be applied respectively to the red and green electron guns of a color television tube to produce red and green images which are suitably filtered for viewing by individual eyes of an observer.

In a further embodiment of the invention, the optical image from a telescope is converted and recorded on two channels of tape, and two readout heads are longitudinally positioned respectively adjacent the channels along the tape path to provide video output signals from these channels. One of the readout heads is longitudinally adjustable relative to the other and provides a video output signal which is delayed with respect to the other video output signal. These signals are suitably applied to video monitors which produce corresponding, relatively delayed images for viewing by respective eyes of an observer.

DESCRIPTION OF THE PREFERRED EMBODIMENTS

Figure 1:
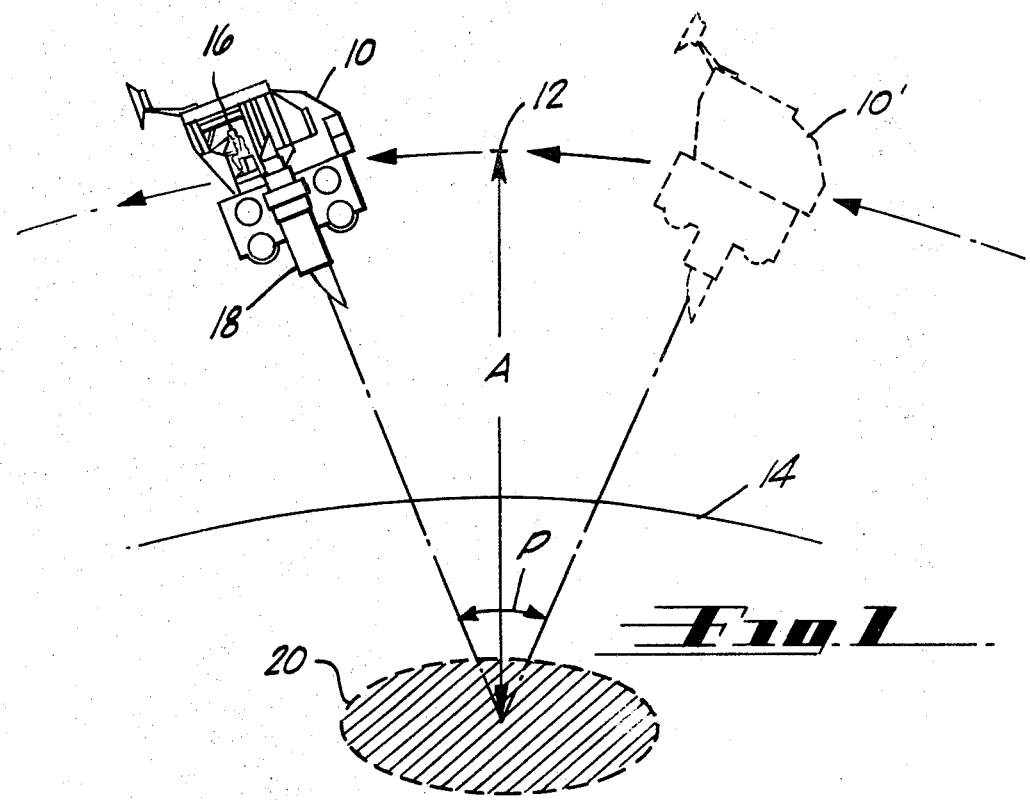
FIG. 1 is a diagrammatic perspective view of a satellite carrying an observer therein making pseudo stereo-optical observations from orbit using a single tlescope in accordance with this invention.

FIG. 1 diagrammatically depicts a satellite 10 in orbit 12 at an average altitude A above the surface of a planet 14. The stellite 10 carries an observer 16 who is making pseudo stereo-optical observations through telescope 18 tracking an area 20. Where the planet 14 is Earth and the satellite's altitude A is about 100 miles, the satellite 10 makes a complete revolution around the Earth in approximately 90 minutes. Thus, the satellite 10 covers approximately 4 degrees of travel per minute. The satellite 10 may be unmanned with the necessary information signal being telemetered, as described later, to a remote station for appropriate conversion into images suitable for stereoscopic viewing.

Satellite 10′ shown in broken lines in FIG. 1 indicates an earlier position of the satellite 10. The lines of sight from these two illustrated positions make a parallax angle P with the center of the tracked area 20. It can be seen, therefore, that the parallax angle P is 4 degrees where the travel time from the representative position indicated by the broken line satellite 10′ to the position of the solid line satellite 10 is one minute.

Figure 2:
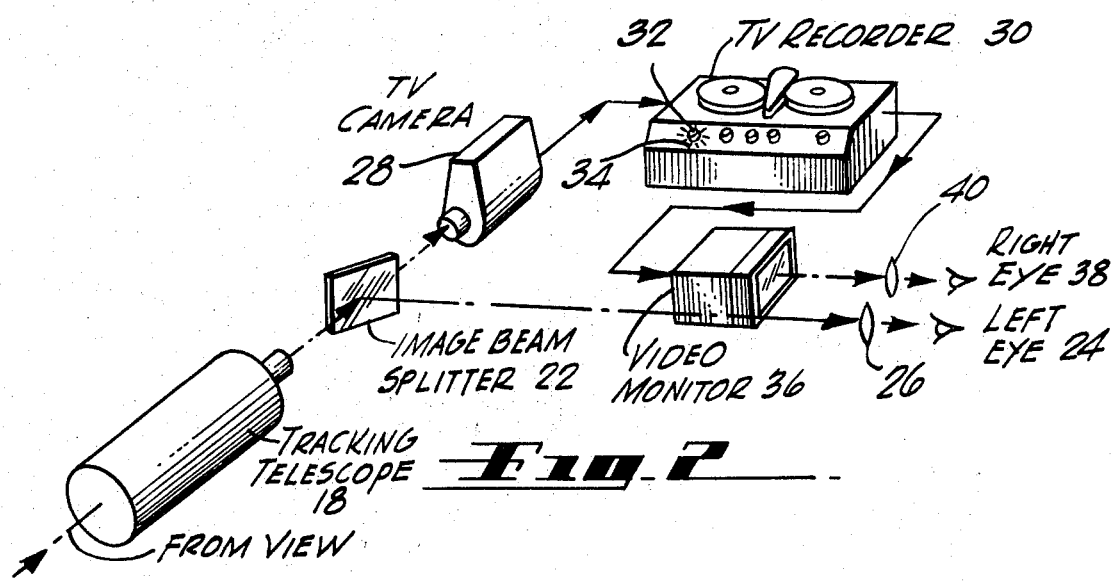
FIG. 2 is another diagrammatic perspective view of one embodiment of the invention wherein the optical image beam of a tracking telescope is optically split to provide two images which are respectively viewed by a television camera and one eye of an observer.

FIG. 2 is a perspective view, generally diagrammatic, of a preferred embodiment of this invention. The image beam from tracking telescope 18 is split by beam splitter 22 and one part is directed to the left eye 24 of an observer for viewing the image presented to it through a suitable lens 26, and the other part is directed to television camera 28. The television camera 28 scans the image presented to it and produces a video signal which is tape recorded on television or video recorder 30.

The record head of the recorder 30 is followed by an adjustable readout head which can be variably positioned, relative to the record head, longitudinally along the tape path. The position of the readout head is adjustable by means of control knob 32 which indicates against suitably calibrated markings 34. Thus, a selectively delayed video signal is obtained from the recorder 30 and this signal is applied to video monitor 36. The video monitor 36 produces a corresponding image which is presented to the right eye 38 of the observer for viewing through a suitable lens 40.

It is apparent that the right eye 38 sees the same image seen earlier by the left eye 24 of the observer. Accordingly, when the left eye 24 of the observer 16 in FIG. 1 is viewing the area 20 from the instantaneous position indicated by the solid line satellite 10, the right eye 38 of the observer 16 is viewing the area 20 from the satellite's earlier position as indicated by the broken line satellite 10'.

Where the readout head of the recorder 30 has been adjusted to delay readout of the video signal being recorded on tap such that the signal applied to the video monitor 36 produces the image previously viewed one minute earlier by the left eye 24, which image is then viewed by the right eye 38, this results functionally in a large, virtual interpupillary separation which has a parallax angle P of approximately 4 degrees at the distance of about 100 miles.

Magnification of the telescope 18 further increases the parallax angle P effectively greater than 4 degrees, of course, making the area 20 appear closer. Thus, the radius of stereoscopic vision is greatly increased and much smaller differences in parallax angles can be perceived. It is noted that this is achieved without requiring binocular telescopes and involves the use of only a single telescope.

The video signal recorded by the recorder 30 on tape is essentially continuous wherein one field is scanned and recorded every 1/60 of a second for the usual or conventional television recording system. Thus, the delay time between the two images viewed by the left and right eyes 24 and 38 is adjustable from 1/60 of a second up to several minutes for a satellite in relatively low earth orbit. This variability in delay permits changes in the effective or virtual interpupillary distance and varies the illusory vertical dimensions sensed by the observer. The illusion of depth is sensed continuously with this invention and may be varied by varying the delay time. Further, motion of an object in area 20 in the direction of the orbit 12 is detected as a change in height. Thus, observations of sharp discontinuities in height indicates movement on the surface of the area 20.

Figure 3:
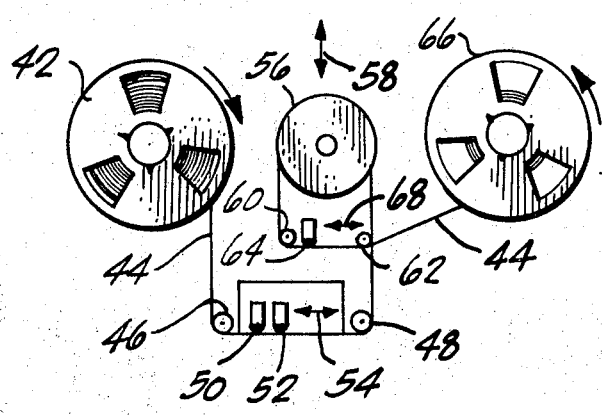
FIG. 3 is a diagrammatic, simplified, top plan view of a video recorder used in this invention, showing an illutrative arrangement of certain of the recorder elements.

FIG. 3 diagrammatically shows in a top plan view a suitable arrangement of the major components of the video recorder 30. Supply reel 42 carries magnetic tape 44 which is taken off the reel 42 and passed over guide rollers 46 and 48 before a fixed record head 50 and a first readout head 52 that is longitudinally adjustable along the path of the tape 44 as indicated by the double-headed arrow 54. The tape 44 is then appropriately looped around and raised in height level on a loop-length control and guide structure 56. The structure 56 is laterally adjustable in position as indicated by double-headed arrow 58. The raised tape 44 is passed over guide rollers 60 and 62 before a second readout head 64 and finally wound up on take-up reel 66. The readout head 64 is also longitudinally adjustable along the path of the tape 44 as indicated by the double-headed arrow 68. The redout head 64 can, of course, be a fixed structure since the adjustable structure 56 obviously can be used to vary the longitudinal tape listance of the readout head 64 from the fixed record head 52. The heads 50, 52 and 64 can be conventional magnetic heads of either the non-rotary (longitudinal recording) or rotary (helical recording) type. Wiring to the record and readout heads 50, 52 and 64, and other incident structure, have been omitted from FIG. 3 for clarity of illustration. Thus, a readout head which is essentially adjustable in longitudinal tape distance from a record head is provided and the diagrammatically represented video recorder and record and readout heads are, of course, of the suitable conventional video form as may be appropriate.

Readout of the video signal recorded by the fixed record head 50 on tape 44 is taken from the first readout head 52 where the parallax angle P (FIG. 1) is small. For a comparatively large parallax angle P, the output is switched over to the second readout head 64 which provides for long delay times. Where, for example, tape speed is 5.75 inches per second, the tape distance between heads 50 and 64 would be 86.25 inches per degree of parallax angle for the satellite 10 at the altitude of about 100 miles covering approximately 4 degrees of travel per minute. The procedure for handling such lengths of looped tape is, of course, the same as that in practice in the computer field. Much slower tape speeds can, of course, be used in video recordings, as is well-known.

Figure 4:
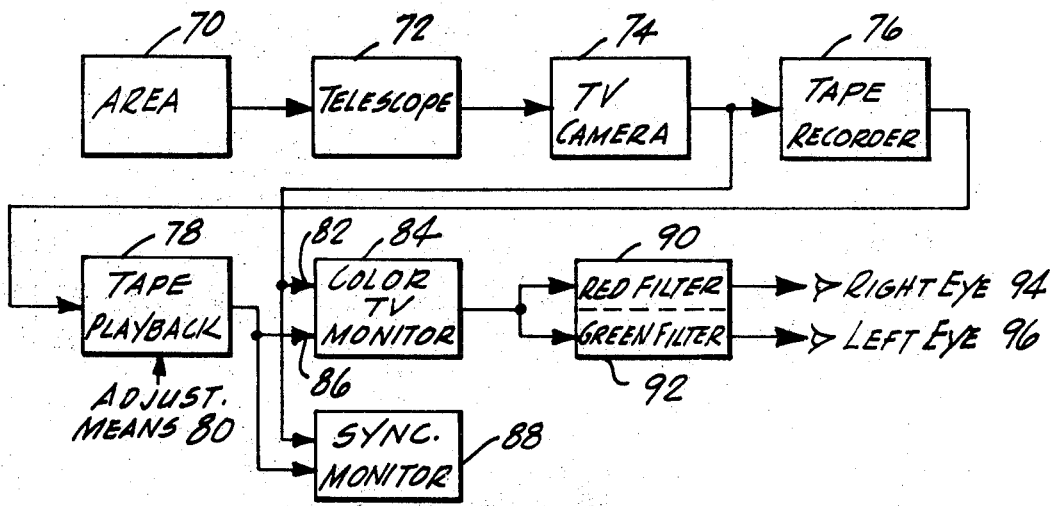
FIG. 4 is a block diagram of another embodiment of the invention wherein single channel recorder means and a color television monitor are utilized to provide the suitable images for stereoscopic viewing by an observer.

FIG. 4 is a block diagram of another preferred embodiment of this invention. An object or area 70 is tracked by telescope 72 which provides an image that is viewed by television camera 74. Television camera 74 may be either an ordinary camera or a color camera since both have video output signals which include a monochrome component. The camera 74 produces a video signal which is recorded on tape recorder 76. Tape playback means 78, which is normally an integral part of the recorder 76 but is representatively shown separately, includes a readout head that is adjustable longitudinally along the tape path relative to the record head. The readout head is adjustable by means 80 to produce a video output signal which can be variably delayed with respect to the video signal from camera 74 and being recorded on tape.

The video signal from camera 74 being recorded on tape is applied to the regular input 82 of color television monitor 84. The horizontal and vertical synchronizing pulses are separated as usual from the video signal and used to control the color electron guns of the monitor 84. The remaining portion of the video signal is conventionally amplified and suitably applied to the intensity control element or grid of the red electron gun (not shown), for example. The delayed video signal from the playback means 78 is applied to an additional input 86 of the monitor 84 and is conventionally amplified and suitably applied to the intensity control element or grid of the green electron gun (not shown), for example, of the monitor 84. The synchronizing pulses in the delayed video signal occur during the blanking intervals, of course, and are in the blacker-than-black region below the black level for the signal. Thus, a red and a green image are produced on the face of the television monitor 84.

The color television monitor 84 can be essentially a conventional color television receiver wherein an additional input is provided to accommodate the delayed video signal, and the blue electron gun and the color decoding circuits are not used (and may be disconnected or deleted). The two relatively delayed video signals both include monochrome signal components, which carry monochrome or luminance picture information, that are suitably amplified and applied to their respective intensity control elements of, for example, the red and green electron guns of the monitor 84.

The video signal from television camera 74 being recorded on tape and the delayed video signal from the tape playback means 78 are also applied to respective inputs of a synchronizing monitor 88. The synchronizing monitor 88 can be, for example, a double trace oscilloscope which presents simultaneously started and returned, vertically aligned traces of the two video signals being applied to the color television monitor 84. The adjustment means 80 is adjusted to provide the desired time delay of the video signal. The traces on the synchronizing monitor 88 are observed as final adjustment is made to align vertically the horizontal and vertical synchronizing pulses of both traces. This assures synchronized information sweeps and scans of both beams of the red and green electron guns of the monitor 84. Such synchronization in scanning a field can be accomplished automatically after adjustment for a desired delay by, for example, initiation of a servo circuit making the fine adjustment in response to the output of conventional coincidence circuitry having, as comparison inputs, the synchronizing pulses separated (clipped) respectively from the two relatively delayed video sigals.

The red and green images on the face of the color television monitor 84 are separated through respective red and green filters 90 and 92 which are normally positioned immediately in front of right and left eyes 94 and 96 of an observer. This permits the red image to reach the right eye 94 only, and the green image to reach the left eye 96 only, of the observer.

Figure 5:
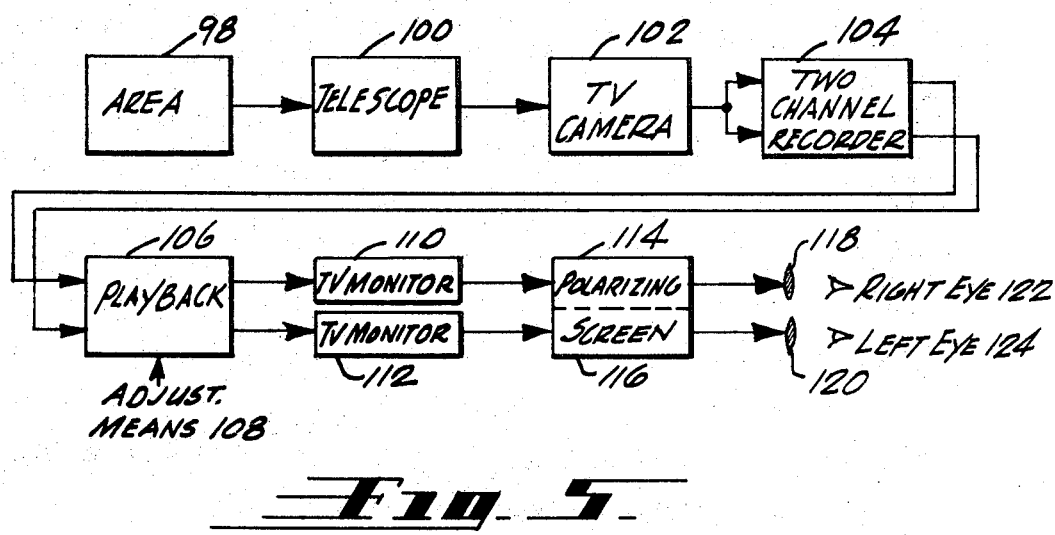
FIG. 5 is another block diagram of a further embodiment of this invention in which dual channel recorder means and corresponding television monitors are utilized to provide two suitable images for stereoscopic viewing by the respective eyes of an observer.

FIG. 5 is another block diagram of a further preferred embodiment of the invention. An object or area 98 is tracked by telescope 100 which provides an image that is viewed by television camera 102. The camera 102 produces a video signal which is simultaneously recorded by respective record heads on two parallel channels of a magnetic tape in a two-channel video recorder 104. Tape playback means 106, which is normally an integral part of the recorder 104 but is representatively shown separately, includes two readout heads that are positioned adjacent to their respective tape channels and at least one readout head is adjustable longitudinally along the tape path relative to a fixed and predetermined position of the other readout head. The adjustable readout head is adjusted by means 108 to produce a video output signal which can be variably delayed with respect to the video output signal from the other, fixed readout head.

The block 104 can alternatively represent a telemeter wherein the video signal from camera 102 is telemetered to a two-channel ground recorder and playback means repersented by block 106 which includes adjustment means 108 for producing two video output signals that are relatively delayed with respect to each other. Thus, a telemeter can be easily incorporated in the system illustrated in FIG. 5. Of course, these relatively delayed video output signals can be applied to a color television monitor such as the monitor 84 for viewing in a system similar to that shown in FIG. 4.

One video signal is applied to television or video monitor 110 in FIG. 5 and the other, relatively delayed video signal is applied to another television or video monitor 112. Two separate, relatively delayed images are thus produced on monitors 110 and 112. Polarizing screens 114 and 116 normally positioned immediately in front of the monitors 110 and 112, respectively, give each of the images a polarized identity. Conventional stereo-glasses including polarizing lenses 118 and 120 worn by the viewer permit only one image to be seen by each of the eyes 122 and 124 of the observer. The lenses 118 and 120 also modify the directions of the images so that they appear superimposed. As is well-known, dissimilar stereo images are mentally fused into a single three-dimensional image. This is, of course, more readily accomplished where the dissimilar images are modified in image directions to appear superimposed.

The invention is applicable to solar astronomy. For example, the earth is, in effect, a satellite circling the sun. Thus, the term "vehicle" as used herein is understood to include the earth and any other telescope mountign structure. Through the use of suitable time delay as taught above, depth illusion can be produced through video recording of the sun's surface. Observation of other relatively stationary bodies outside of the earth's orbit can also be enhanced, although the baselines for the parallax angle of the more distant celestial bodies do not appear sufficiently large to produce a significant advantage.

The term "vehicle" clearly includes aircraft which is, for example, used in aerial surveys or reconnaissance. It also includes scanning structure mounting a microscope, or any other optical viewing system or device. In this instance, the telescope indicated in FIGS. 2, 4 and 5 represents the appropriate optical system or device. There are, obviously, many other variations of the different elements of this invention.

In the military regime, the invention can be used to identify troop movements by comparing earlier frames scanned by the television camera with later frames; i.e., relatively small moving objects would appear to have exaggerated depth and similar non-moving objects would appear to have normal depth. Since depth can be magnified through appropriate selection of time delay, this invention is useful in detecting the movement of camouflaged ships at sea through the observation of slight vertical discontinuities.

Further, special ultraviolet and infrared devices can be used in conjunction with this invention. For example, an ultraviolet or infrared filter can be used just before the objective lens of the tracking telescope, or the television camera can have an ultraviolet or infrared photosensitive surface on which the telescope's image is focused, for obtaining a three-dimensional image which is highly useful in the detection of geological fields, mineralogical deposits, ocean temperature and current distributions, crop diseases, etc. It is apparent that the invention is susceptible to numerous applications and uses other than those described.

The foregoing illustrative examples of this invention may be obviously modified in various ways without altering the principles involved. It is, therefore, to be understood that the particular embodiments of the invention described above and shown in the drawings are merely illustrative of and not restrictive on the broad invention, and that various changes in design, structure and arrangement may be made without departing from the spirit and scope of the invention.

What is claimed is:

1. Pseudo stereo-optical observation means comprising:

an optical viewing device mounted on a movable vehicle adapted to track and view a selected object or area, and producing an image thereof as said vehicle is moved from a first to a second position over a corresponding parallax angle formed between said positions relative to the tracked and viewed object or area; and means for providing the image from said viewing device to one eye of an observer, and a delayed image of the image from said viewing device to the other eye of the observer, said image providing means including a television camera positioned to perceive the image from said viewing device and scan the same at a standard electronic speed to produce a video signal therefrom, a video recorder having record means for recording the video signal on tape and playback means for playing back the recorded video signal, means for varying the longitudinal tape distance of said playback means from said record means to provide an output video signal that is variably delayed in time with respect to the video signal being recorded, and video monitoring means for producing a delayed image from the variably delayed output video signal for viewing by the other eye of the observer.

2. The invention as defined in claim 1 wherein said optical viewing device is a telescope and the vehicle is a satellite in orbit about a planet, and the delay between the video signal being recorded and the variably delayed output video signal, corresponding respectively to a first and a second orbit position of said satellite, is proportional to the parallax angle between said orbit positions relative to the viewed object or area.

3. The invention as defined in claim 1 wherein said image providing means further includes a beam splitter positioned to split the optical image beam from said viewing device, and presenting one part for viewing by the eye of the observer and the other part of the split beam to said television camera for producing the video signal therefrom.

4. The invention as defined in claim 1 wherein said longitudinal tape distance varying means includes a loop-length control and guide means for adjusting loop length of the tape between said record means and said playback means.

5. The invention as defined in claim 1 wherein said video monitoring means comprises a color television monitor which is adapted to produce an image from the video signal being recorded and the delayed image from the variably delayed output video signal in respective colors, and including color filters positioned to allow only an image of a corresponding color to be seen by each eye of the observer.

6. The invention as defined in claim 1 wherein
said video recorder comprises a multiple channel recorder including record means for recording the video signal simultaneously on at least two channels of tape and playback means which is adjustable to provide two output video signals that are relatively delayed variably in time with respect to each other, and
said video monitoring means comprises first and second video monitors adapted to receive the two relatively delayed output video signals, respectively, for producing separate images therefrom, and including polarizing viewing means positioned to allow each image to be seen only by a corresponding eye of the observer.

7. The invention as defined in claim 6 wherein said multiple channel recorder comprises
a supply reel having recording tape thereon,
a take-up reel for taking up the tape reeled off said supply reel,
at least two recording heads positioned adjacent to respective channels of the tape between said supply and take-up reels for recording the video signal simultaneously on the two channels of tape, and
at least two readout heads positioned adjacent to the respective channels of tape following their corresponding recording heads, at least one of said readout heads being adjustable longitudinally along the tape path relative to a normally fixed and predetermined position of the other of said readout heads to provide the two output video signals that are relatively delayed variably in time with respect to each other.

References Cited

UNITED STATES PATENTS

| | | | |
|---|---|---|---|
| 2,918,524 | 12/1959 | Hume | 178—5.6 |
| 2,949,055 | 8/1960 | Blackstone | 178—6.5 |
| 3,192,476 | 6/1965 | Nuffer. | |
| 3,358,079 | 12/1967 | Banning | 178—6.5 |

OTHER REFERENCES

RCA Broadcasting News, vol. 118, October 1963, p. 37.

ROBERT L. GRIFFIN, Primary Examiner

H. W. BRITTON, Assistant Examiner

U.S. Cl. X.R.

178—6.5, 6.6

UNITED STATES PATENT OFFICE
CERTIFICATE OF CORRECTION

Patent No. 3,527,880   Dated September 8, 1970

Inventor(s) Theodore J. Gordon

It is certified that error appears in the above-identified patent and that said Letters Patent are hereby corrected as shown below:

Column 2, line 27, "tlescope" should read -- telescope --; line 36, "illutrative" should read -- illustrative --; line 54, "stellite" should read -- satellite --. Column 4, line 1, "redout" should read -- readout --; line 3, "listance" should read -- distance --; line 4, "52" should read -- 50 --; line 8, "incident" should read -- incidental --. Column 5, line 46, "repersented" should read -- represented --; line 73, "mountign" should read -- mounting --.

Signed and sealed this 27th day of April 1971.

(SEAL)
Attest:

EDWARD M. FLETCHER, JR.
Attesting Officer

WILLIAM E. SCHUYLER, JR.
Commissioner of Patents